United States Patent
Journot

(10) Patent No.: US 8,120,863 B2
(45) Date of Patent: Feb. 21, 2012

(54) DEVICE FOR SAMPLING A PLURALITY OF PARTS OF A LIGHT BEAM

(75) Inventor: Eric Journot, Saint Selve (FR)

(73) Assignee: Commissariat a l'Energie Atomique, Paris (FR)

( * ) Notice: Subject to any disclaimer, the term of this patent is extended or adjusted under 35 U.S.C. 154(b) by 207 days.

(21) Appl. No.: 12/521,553

(22) PCT Filed: Dec. 24, 2007

(86) PCT No.: PCT/EP2007/064535
§ 371 (c)(1),
(2), (4) Date: Jun. 26, 2009

(87) PCT Pub. No.: WO2008/080915
PCT Pub. Date: Jul. 10, 2008

(65) Prior Publication Data
US 2010/0321807 A1    Dec. 23, 2010

(30) Foreign Application Priority Data
Dec. 28, 2006    (FR) ...................................... 06 56021

(51) Int. Cl.
G02B 5/04    (2006.01)

(52) U.S. Cl. ...................................................... 359/834

(58) Field of Classification Search .................. 359/831, 359/833–837, 290–291, 431, 592–598, 737
See application file for complete search history.

(56) References Cited

U.S. PATENT DOCUMENTS

| | | | |
|---|---|---|---|
| 4,759,616 A | 7/1988 | Marchant | |
| 5,504,620 A | 4/1996 | Maul | |
| 5,737,124 A * | 4/1998 | Sarayeddine | 359/485.07 |
| 2004/0066558 A1 | 4/2004 | Weng | |
| 2005/0067087 A1 | 3/2005 | Sannokyou | |
| 2005/0259337 A1 | 11/2005 | Chen | |

FOREIGN PATENT DOCUMENTS

| | | |
|---|---|---|
| GB | 1184080 A | 3/1970 |
| GB | 2304923 A | 3/1997 |
| WO | 2005103796 A1 | 11/2005 |

OTHER PUBLICATIONS

International Search Report, PCT/EP2007/064535, dated Mar. 14, 2008.
French Search Report, FR 06 56021, dated Aug. 2, 2007.
Preliminary Examination Report mailed Sep. 17, 2009 in application No. PCT/EP2007/064535.

* cited by examiner

Primary Examiner — Jennifer L. Doak
(74) Attorney, Agent, or Firm — Nixon Peabody LLP

(57) ABSTRACT

Device for sampling a plurality of parts of a light beam, comprised of at least one optical component which comprises a plate made of a material which is transparent to the light beam, where this plate has first and second faces which are flat and parallel, and a third face which is flat and which forms a dihedron with the first face, where the angle of this dihedron is equal to π-α where 0<α≦Arcsin(1/n) where n if the refractive index of the material, so that by sending the light beam onto the first face, at an angle of incidence equal to Arcsin (n·sin(α)), a first sampled part (44) and a second sampled part are recovered, as well as the greater part of the light beam. The device is applicable in particular to the diagnostics of a laser beam.

10 Claims, 2 Drawing Sheets

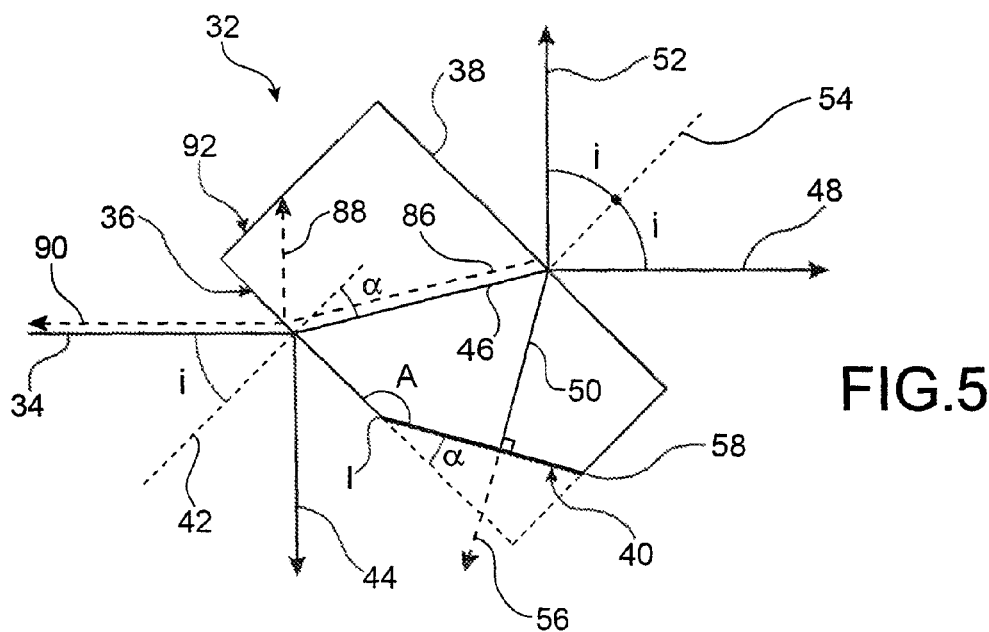
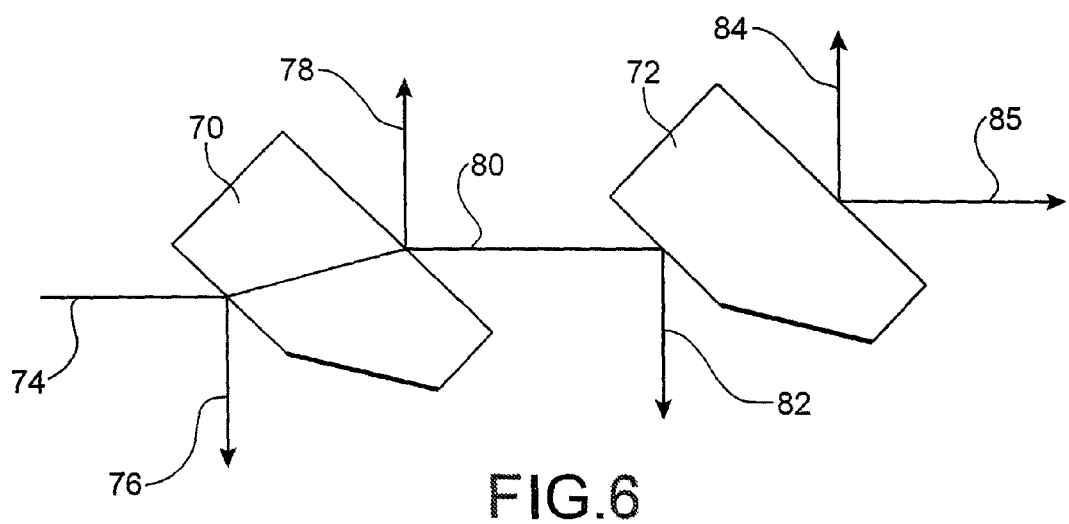

DEVICE FOR SAMPLING A PLURALITY OF PARTS OF A LIGHT BEAM

CROSS REFERENCE TO RELATED APPLICATIONS OR PRIORITY CLAIM

This application is a national phase of International Application No. PCT/EP2007/064535, entitled "DEVICE FOR SAMPLING A PLURALITY OF PARTS OF A LIGHT BEAM", which was filed on Dec. 24, 2007, and which claims priority of French Patent Application No. 06 56021, filed Dec. 28, 2006.

BACKGROUND

The present invention relates to a device for sampling a plurality of parts of a light beam, in particular a laser beam.

This device includes at least one optical component which is designed to produce two optical samples from a light beam with parallel rays, with no ghost images.

The invention applies in particular to diagnostics on laser beams.

In this field it is often necessary to have several separate samples of a beam in order to achieve complete characterisation of it.

From now on we hereby indicate that the above mentioned component allows the generation of three distinct, completely decoupled and ghost-free diagnostic paths. Photometric measurement of the paths may be managed in a conventional manner by the type of semi-reflecting treatment deposited on each face of the component.

In order to sample one or more parts of a light beam, in particular a laser beam, the use of a plate 2 (FIG. 1) is known which has two flat parallel faces, or a prismatic plate 4 (FIG. 2), or a beam-splitter cube 6 (FIG. 3), or a diffractive component 8 (FIG. 4).

The components shown in FIGS. 1 to 3 only produce a single sampling path 10 from an incident light beam 12, and the diffractive component 8 produces as many samples 14 as there are orders of diffraction.

Furthermore, in addition to the sample 10, the plate with flat parallel faces 2 generally produces several ghost beams. One of the latter 15 is seen in FIG. 1. It is parallel to the beam 16 transmitted by the cube 2 and two other ghost beams 18 can be seen which are parallel to the ghost beam 10 reflected by this cube.

The amplitude of the most significant of the ghost beams is typically 10% of the incident beam 12, and this could prove problematic with a coherent beam because of the interferences which result from it.

The prismatic plate 4 partly resolves this problem: In FIG. 2 it can be seen that the ghost beams 20 and 22 have directions which are respectively separate from that of the reflected beam 10 and that of the transmitted bream 24, but the separation is poor and the transmitted beam 24 is deviated, which complicates the mechanical incorporation of the analysis system (not shown) which uses the prismatic plate.

The beam-splitter cube 6 resolves the problem of ghost imaging well enough. Indeed, there can be seen in FIG. 3 two ghost beams 26 and 28 which are respectively parallel to the reflected beam 10 and to the transmitted beam 30, and the maximum ghost amplitude is typically a hundred times less than that of the incident beam 12. The cube 6, however, only produces one sample.

As for the diffractive component 8, this generates several samples 14 and fully resolves the problem of ghost imaging. It does, however, result in temporal distortion of a pulsed light beam and produces dispersion of a beam which is not perfectly single-mode. Two diffractive components must then be used to partly resolve these distortion and dispersion problems.

SUMMARY OF THE INVENTION

The purpose of the present invention is to remedy the above shortcomings by offering a device which is suitable for providing at least two samples which are free of ghost images from one incident light beam, and which enables a beam diagnosis system using this device to be easily incorporated.

In precise terms, the object of the present invention is a device for sampling a plurality of parts of a light beam, where this device is characterised in that it comprises at least one optical component which comprises a plate made of material which is transparent to the light beam, where this plate has first and second faces which are flat and parallel and a third face which is flat and which forms a dihedron with the first face, where the angle of this dihedron is equal to $\pi-\alpha$ with
$0<\alpha \leq \mathrm{Arcsin}(1/n)$
where n is the refraction index of the material,
so that by sending the light beam onto the first face at an angle of incidence equal to $\mathrm{Arcsin}(n\cdot\sin(\alpha))$, a first sampled part and a second sampled part are recovered, together with the major part of the light beam.

The third face is preferably made reflective whit respect to the light beam.

The first and second faces may be treated, so that they have a specific reflectance with respect to the light beam.

The angle $\alpha$ may be equal to $\mathrm{Arcsin}(\sqrt{2}/2n))$.

The device that is the object of the invention may comprise at least two said components, placed one after the other, so as to increase the number of sampled parts.

The present invention also relates to a process for sampling a plurality of parts of a light beam, where this process uses the device that is the object of the invention.

BRIEF DESCRIPTION OF THE DRAWINGS

The present invention will be better understood by reading the description of embodiments below, which are given for purely informative purposes and which are in no way limitative, whilst referring to the appended drawings in which:

FIG. 5 is a schematic view from above of one particular embodiment of the device which is the object of the invention and FIG. 6 is a schematic view of another device which is in accordance with the invention,

DETAILED DESCRIPTION OF PARTICULAR EMBODIMENTS

Figure 1:
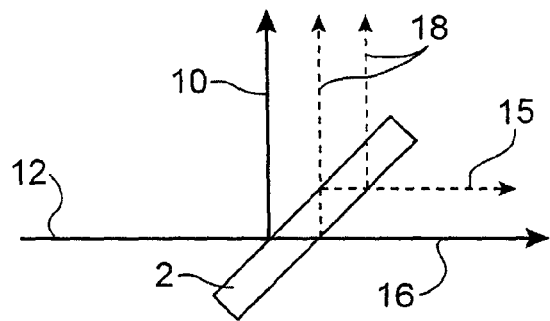
FIGS. 1 to 4 are schematic views of known devices for sampling beams and have already been described.
Figure 2:
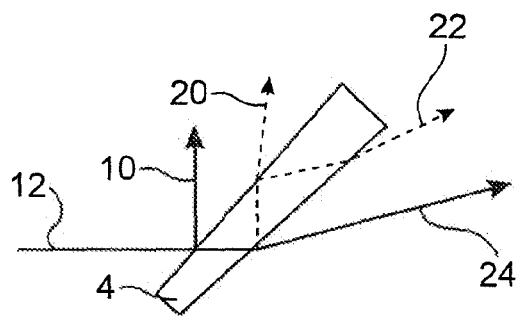
Figure 3:
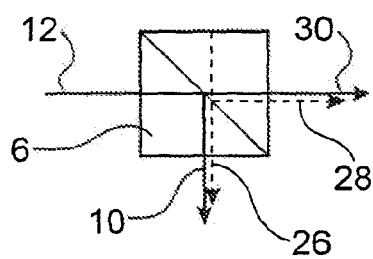
Figure 4:
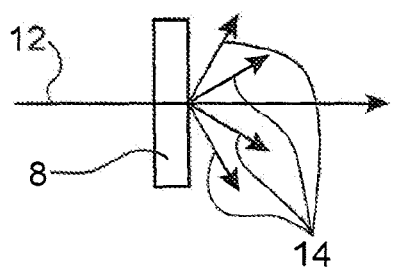

The device which is in accordance with the invention which is schematically shown in FIG. 5 comprises a single optical component 32.

This component is capable of creating two samples which are free of ghost-images from one incident light beam 34 which is monochromatic and parallel, that is, whose rays are parallel, such as, for example, a laser beam. Furthermore, the component allows a diagnostic device which includes this component to be easily incorporated.

The component 32 is a prism which is produced from a plate with flat parallel faces a part of which has been truncated.

More specifically, the prism 32 is made of a material which is transparent to the incident beam 34 and includes a first face 36 and a second face 38 which are flat and parallel to each other. Furthermore, the prism includes a third face 40 which forms a dihedron with the first face 34.

The outline trace of this dihedron and an edge I of the latter can be seen in FIG. 5, which is a view of the component from above. The faces 36, 38 and 40 are therefore perpendicular to the plane of this FIG. 5.

The angle A of the dihedron is equal to $\pi-\alpha$ where $\alpha$ is the truncation angle of the plate, where the truncated part is defined by dotted lines in FIG. 5. This angle $\alpha$ is such that:

$$0 < \alpha \leq \text{Arcsin}(1/n)$$

where n represents the refractive index of the material at the wavelength of the beam 34.

It should be noted that the component 32 is used by sending the beam 34 onto the first face 36 so that this beam forms an angle of incidence i ($0 < i \leq \pi/2$) with a normal 42 to this face, such that:

$$\sin(i) = n \cdot \sin(\alpha) \text{ or } i = \text{Arcsin}(n \cdot \sin(\alpha)).$$

As can be seen in FIG. 5, a first part 44 of the beam 34 is sampled by reflection on the face 36 but the majority of the beam 34 leads to the refracted beam 46. The latter emerges from the face 38 as a beam 48 which is parallel to beam 34.

The refracted beam 46, which forms the angle $\alpha$ with the normal 42 (according to the Snell-Descartes law, the angle of refraction is such that $\sin(i) = n \cdot \sin(a)$), is also partly reflected onto the second face 38 to give a reflected beam 50. The latter propagates towards the face 40 along a straight line which is perpendicular to this face 40, and is therefore partly reflected from the latter along the same line. It then emerges from the face 38 as a beam 52 which forms a second sampled part of the incident beam 34. Each of the beams 48 and 52 forms an angle i with a normal 54 to the face 38.

It should be noted furthermore that the greater part 56 of the beam 50 emerges from the face 40, perpendicular to the latter, and can thus form a third sample path. However, the existence of this part 56 would lead to a low intensity of the second sampled part, formed by the beam 52.

For this reason the face 40 is made reflective, for example by forming a metal layer 58 on this face, so as not result in loss of signal on the sample path 52.

It should also be noted that if the entry and exit faces 36 and 38 of the component are not treated, the two samples formed by the beams 44 and 52 each carry between 2% and 8% of the incident energy, depending on the polarisation of the beam 34.

Irrespective of the polarisation characteristics of this incident beam 34, treatment of faces 36 and 38 may be carried out in order to adapt the reflectance of these faces if this is necessary.

In the specific case where i is 45° ($\pi/4$ radians) both sampling paths 44 and 52 are perpendicular to the incident beam 34, which facilitates the mechanical incorporation of the other components (not shown) of the beam diagnostic system.

In this case, the angle $\alpha$ is equal to $\text{Arcsin}(1/(n\sqrt{2}))$.

A particular case which is of little interest can also be noted when $\alpha$ is equal to the limiting value $\text{Arcsin}(1/n)$, i is equal to $\pi/2$.

The compact component 32 produces two samples 44 and 52 from the beam 34 with no ghost images for the analysis system. This is of great benefit in the analysis of the beam 34. Furthermore, this component is a single-piece unit which is very easy to manufacture and it may be used in series in order to multiply the number of paths.

FIG. 6 shows two components 70 and 72 which are placed one after the other. These components are of the same type as component 32. One can see an incident laser beam 74 which arrives at the first face of the component 70 and the two samples 76 and 78 which correspond to this component 70. The transmitted beam has reference number 80.

This beam 80 reaches the component 72 whose first face is opposite the second face of the component 70 and parallel to the latter. The component 72 provides two samples 82 and 84. The beam transmitted by the component 72 has reference number 85.

Going back to FIG. 5, one sees the ghost light beams 86, 88 and 90 which are the result of reflections of light inside the prism 32.

The beam 88 is directed towards the face 92 of the prism, the face which links faces 36 and 38, as shown. This face 92 is unpolished in order to prevent specular reflection of the beam 88.

The single ghost return (beam 90) undergoes two reflections and is therefore very weak. Furthermore it returns towards the source (not shown) of beam 34, which does not interfere with the measurement.

If necessary a slight alteration can be made to one of the angles i or $\alpha$ in order to alter the direction of this ghost return.

It should be noted that the component 32 laterally offsets the main beam: the beam 48 is offset with respect to the beam 34. This may be corrected, however, using a second component identical to component 32 and fitted symmetrically. In that case, using the same notation as in FIG. 6, the beam 85 emerges in the extension to the beam 74.

It can also be noted that, like all reflection sampling diagnostics, the component 34 can modify the polarisation state of a beam if the incident electromagnetic field is not of TE or TM type.

The device that is the object of the invention may be used with any laser beam whatsoever from which it is desired to take several samples.

The invention claimed is:

1. A device for sampling a plurality of parts of a light beam, comprising at least one optical component that comprises a plate made of a material that is transparent to the light beam, the material being bound between a first face and a second face which are flat and parallel, the plate having a third face which is flat and which forms a dihedron with the first face, wherein the angle of this dihedron is equal to $\pi-\alpha$, where $$0 < \alpha < \text{Arcsin}(1/n)$$

where n is the refraction index of the material,
wherein by sending the light beam onto the first face, at an angle of incidence equal to $\text{Arcsin}(n \cdot \sin(\alpha))$, a first sampled part and a second sampled part are recovered, together with the greater part of the light beam.

2. The device according to claim 1, in which the third face is made reflective with respect to the light beam.

3. The device according to claim 1, in which the first and second faces are treated, so that they have specific reflectances with respect to the light beam.

4. The device according to claim 1, in which the angle $\alpha$ is equal to $\text{Arcsin}(\sqrt{2}/2n))$.

5. The device according to claim 1, comprising at least two of said components, placed one after the other, so as to increase the number of sampled parts.

6. A process for sampling a plurality of parts of a light beam, comprising:
directing the light beam at an angle of incidence equal to $\arcsin(n \cdot \sin(\alpha))$ to a first face of an optical component that comprises a plate made of a material that is transparent to the light beam, the material being bound between the first face and a second face which are flat and parallel, the plate having a third face which is flat and which forms a dihedron with the first face, wherein the angle of this dihedron is equal to $\pi-\alpha$, $0<\alpha<\text{Arcsin}(1/n)$, and n is the refraction index of the material; and recovering a first sampled part and a second sampled part of the light beam, together with the greater part of the light beam.

7. The process of claim 6, wherein the third face is made reflective with respect to the light beam.

8. The process of claim 6, wherein the first and second faces are treated, so that they have specific reflectances with respect to the light beam.

9. The process of claim 6, wherein the angle $\alpha$ is equal to $\text{Arcsin}(\sqrt{2}/2n))$.

10. The process of claim 6, further comprising directing the light beam to a second optical component identical to the first.

* * * * *